United States Patent
Burcham et al.

(10) Patent No.: US 11,276,084 B1
(45) Date of Patent: Mar. 15, 2022

(54) THREE TIER DATA STRUCTURES FOR TARGETING DATA

(71) Applicant: T-Mobile Innovations LLC, Overland Park, KS (US)

(72) Inventors: Robert H. Burcham, Overland Park, KS (US); Geoffrey A. Holmes, Olathe, KS (US); Umesh Chandra Upadhyay, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1161 days.

(21) Appl. No.: 14/455,934

(22) Filed: Aug. 10, 2014

(51) Int. Cl.
  *G06Q 30/00* (2012.01)
  *G06Q 30/02* (2012.01)
(52) U.S. Cl.
  CPC .................. *G06Q 30/0269* (2013.01)
(58) Field of Classification Search
  None
  See application file for complete search history.

(56) References Cited

U.S. PATENT DOCUMENTS

| | | | | |
|---|---|---|---|---|
| 2003/0212658 A1* | 11/2003 | Ekhaus | ............. | G06F 17/30539 |
| 2011/0106607 A1* | 5/2011 | Alfonso | .................. | G06Q 30/02 |
| | | | | 705/14.25 |
| 2011/0207440 A1* | 8/2011 | Ruuspakka | ............. | H04W 4/08 |
| | | | | 455/414.1 |
| 2015/0379546 A1* | 12/2015 | Vieri | .................. | G06Q 30/0239 |
| | | | | 705/14.25 |

* cited by examiner

*Primary Examiner* — Kambiz Abdi
*Assistant Examiner* — Christopher Stroud

(57) ABSTRACT

A data management platform server that organizes and transforms data in a 3-tier data structure. The server comprises an application stored in a memory that transforms data into profiles. The application stores the profiles to a profile data store. The application selects a first profile subset from the profiles based on a first criterion. The application selects a second profile subset form the profiles based on a second criterion, where at least some of the profiles in the first profile subset are not in the second profile subset and wherein at least some of the profiles in the second profile subset are not in the first profile subset. The application stores the first profile subset and the second profile subset to a profile data store. The application receives a request from an ad gateway for the first profile subset and transmits the first profile subset to the ad gateway.

19 Claims, 6 Drawing Sheets

THREE TIER DATA STRUCTURES FOR TARGETING DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Ads may be sent to mobile communication devices, such as mobile phones, to be presented on the display of the mobile communication device. For example, when a browser or game application is active, ads may be presented in portions of the display, such as in a banner ad location at the top of a screen or down at the bottom of a body of content that may be seen as a user of the device scrolls down through the content. The different locations where an ad may be presented on the mobile communication device and/or in a screen of an application on the device may be referred to as slots. Slots may be available at the top of a screen, on the right side of the screen, on the left side of the screen, at the bottom of the screen, or at other locations in the screen. Increasingly, advertisers are interested in more effective targeting of advertisements to mobile communication devices. Advertisements that are presented by mobile communication devices may be referred to as mobile advertisements or mobile ads.

Mobile ads that match a profile of a user of a mobile communication device tend to be more successful in eliciting behavior that the advertiser desires, for example the user buying an advertised product or promoting a memory of the product in the mind of the user. Such ads may be referred to as targeted ads. Targeted ads may be employed in different scenarios. In a first scenario, an advertiser wants a particular mobile ad to be sent to a number of mobile devices, for example to 1000 devices and/or users of the devices, and wants the profile of the users to match the particular mobile ad. For example, an advertiser wants to send an advertisement for a luxury car to 1000 devices and/or users of the devices and wants those 1000 users to be selected from a larger population of device users (for example, a population of 1,000,000 users in a particular metropolitan area) based on an annual income associated with the selected users. In a second scenario, an application on a mobile communication device requests a mobile ad from an advertising gateway or source of mobile ads, and the advertising gateway wants to select one mobile ad from a large number of mobile ads stored in an ad repository to match the selected ad to a profile of the device and/or the user of the device. For example, the advertising gateway searches an ad repository for a mobile ad for presenting on the mobile device of a 45 year old man with a high income. In this case, the search may return a mobile ad for a luxury car. Both the first scenario and the second scenario may be referred to as targeted advertising.

SUMMARY

In an embodiment, a data management platform server that organizes and transforms data in a 3-tier data structure is disclosed. The data management platform server comprises a processor, a memory, and an application stored in the memory, that when executed by the processor transforms data into profiles that are indexed by identities of individuals, wherein the data is stored in a network data store, wherein the network data store comprises a first computer, and wherein the network data store represents a first tier of data. The application stores the profiles to a profile data store, wherein the profile data store comprises a second computer, and wherein the profile data store represents a second tier of data. The application selects a first profile subset from the profiles based on a first profile subset selection criterion. The application then selects a second profile subset from the profiles based on a second profile selection criterion, where at least some of the profiles in the first profile subset are not in the second profile subset and wherein at least some of the profiles in the second profile subset are not in the first profile subset. The application stores the first profile subset and the second profile subset to a profile subset data store, wherein the profile subset data store comprises a third computer, and wherein the profile subset data store represents a third tier of data. The application receives a request from an ad gateway for the first profile subset. The application then transmits the first profile subset to the ad gateway, wherein the ad gateway sends targeted ads to individuals based on the first profile subset.

In an embodiment, a method of transforming and organizing data using a data management platform server and cache managers in a 3-tier data structure is disclosed. The method comprises a first cache manager transforming data into profiles that are indexed by identities of individuals, wherein the first cache manager is an application that executes on a computer, wherein the data is stored in a network data store, wherein the network data store comprises a first computer, and wherein the network data store represents a first tier of data. The method further comprises storing the profiles to a profile data store by the first cache manager, wherein the profile data store comprises a second computer, and wherein the profile data store represents a second tier of data. The method further comprises the first cache manager selecting a first profile subset from the profiles based on a first profile subset selection criterion. The method further comprises the first cache manager selecting a second profile subset from the profiles based on a second profile subset selection criterion where at least some of the profiles in the first profile subset are not in the second profile subset and wherein at least some of the profiles in the second profile subset are not in the first profile subset, wherein the profile subsets represent a third tier. The method further comprises the first cache manager transmitting the first profile subset and the second profile subset to a second cache manager. The method further comprises the second cache manager storing the first profile subset and the second profile subset to a profile subset data store, wherein the second cache manager is an application that executes on a computer, wherein the profile subset data store comprises a third computer, and wherein the profile subset data store represents a third tier of data. The method further comprises the second cache manager receiving a request from an ad gateway for the first profile subset. The method further comprises the second cache manager transmitting the first profile subset to the ad gateway. The method further comprises the ad gateway sending a targeted advertisement to an individual based on the first profile subset.

In an embodiment, a method of transforming data into client profiles in a three tier data system using cache managers is disclosed. The method comprises a profile cache manager receiving a set of profile data from a data management platform server, wherein the profile cache manager is an application that executes on a first computer. The method further comprises the profile cache manager organizing the profile data, wherein the profile cache manager identifies profile data that matches identities of individuals. The method further comprises the profile cache manager transforming the organized profile data into profiles. The method further comprises the profile cache manager storing the profiles to a profile data store. Wherein the profile data store comprises a second computer that is separate from the first computer. The method further comprises the profile cache manager receiving profile subset selections from a client profile cache manager, wherein the client profile cache manager is an application that executes on a computer. The method further comprises the profile cache manager selecting profile subsets using the profile subset selections from the client profile cache manager. The method further comprises the profile cache manager transmitting the profile subsets to the client profile cache manager. The method further comprises the client profile cache manager storing the profile subsets to a profile subset data store, wherein the profile subset data store comprises a third computer that is separate from the first computer and the second computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
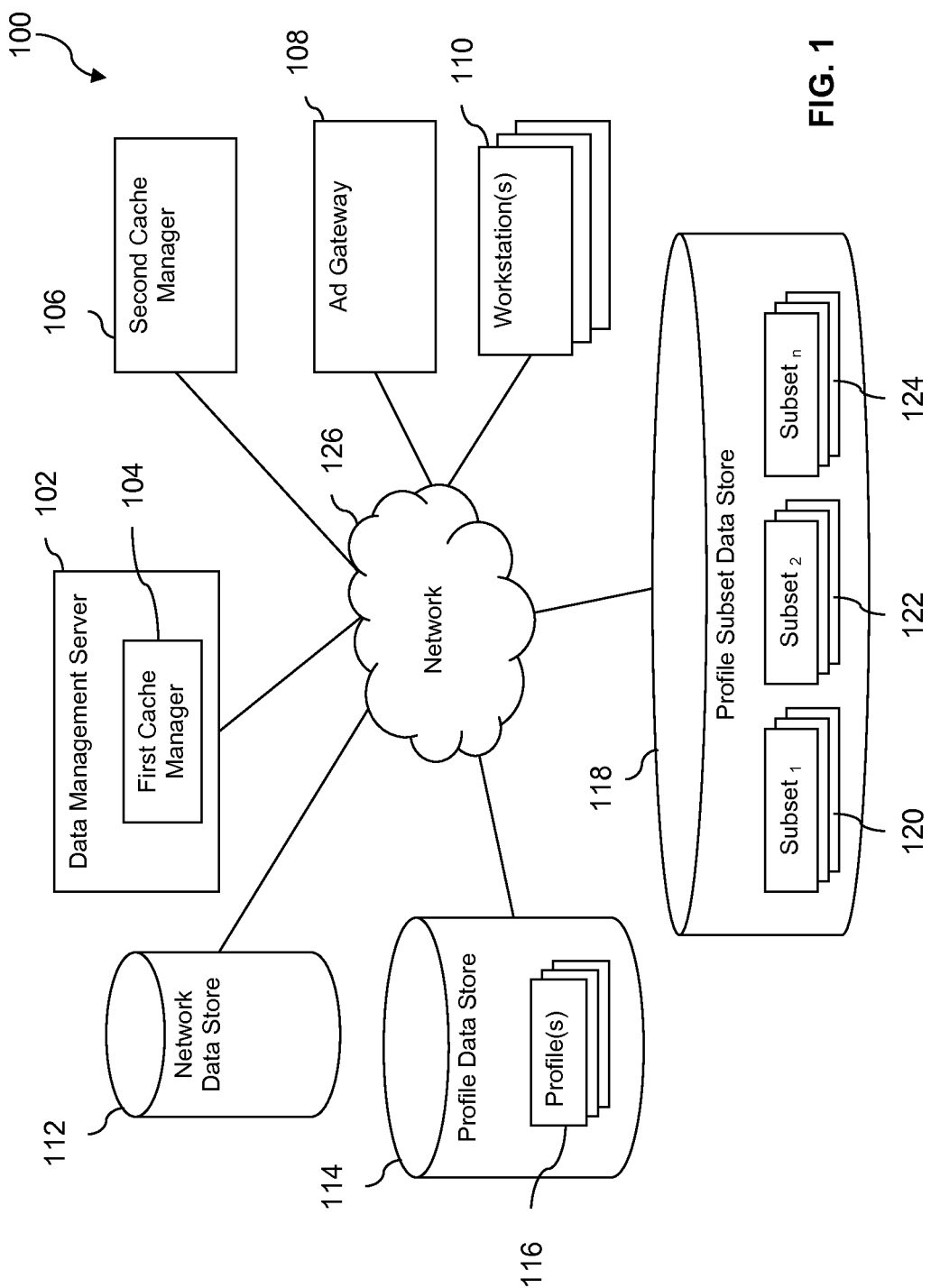
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods for transforming and organizing data in a 3-tier data structure for promoting fast targeted advertising. Targeted ads may desirably be selected, transmitted to, and presented by the subject mobile communication device within about 2 seconds after an initial request for an ad from the device or after a request to push a specific ad to one or more mobile devices associated with a profile that satisfies a targeting criteria. Supporting this fast response time can be challenging. The 3-tier data structure organizes the profile data about prospective ad targets (e.g., targeted advertisement recipients) and further herein helps achieve the desired response time.

The 3-tier data structure promotes this rapid response and retrieval of data for companies to send targeted advertisements as it takes raw data related to individuals and transforms it into profiles and further into profile subsets. The profiles have data parameters derived from the raw data such as gender, age, occupation, salary, purchase history, and internet browser history. From these profiles, separate profile subsets are selected that match specifications that companies have established to match a targeted audience. For example, a light beer advertisement that is focused on reaching young men should desirably be sent to young men. A profile subset may be selected to exclusively represent young men.

In an embodiment, the system comprises a data management platform server. The data management platform server is communicatively coupled with a network data store. The data management platform server receives data from the network data store. This data, which may be referred to as tier 1 data, is comprised of information about individuals that may comprise the gender, age, occupation, salary, purchase history, internet browser history, or other parameters of data of individuals. A first cache manager receives this data from the data management platform server. The first cache manager transforms the data and indexes the data by the identities of the individuals into profiles, each profile associated with one individual and/or mobile communication device user. These profiles may be referred to as tier 2 data.

The data may be transformed in a variety of ways. For example, some of the data parameters may be transformed into decile values. For example, age of an individual may be ranked in the decile system as: ages 0-9 may represent decile 1 of 10, ages 10-19 may represent decile 2 of 10, ages 20-29 may represent decile 3 of 10, ages 30-39 may represent decile 4 of 10, ages 40-49 may represent decile 5 of 10, ages 50-59 may represent decile 6 of 10, ages 60-69 may represent decile 7 of 10, ages 70-79 may represent decile 8 of 10, ages 80-89 may represent decile 9 of 10, and ages 90 and up may represent decile 10 of 10. Other data parameters of the profiles may be organized in a quintile value system, a decile value system, a centile value system, or some other system of discrete values. Other data parameters of the profiles may represent a composite of data and/or behavioral information. For example, a technology comfort level may be defined to contain a discrete number of values such as early adapter, technically astute, late adapter, and technically averse. Individuals may be given one of these technology comfort levels based on a composite of disparate data, for example based on a frequency of using new communications technologies, a data of first use of new communications technologies, the type of mobile communication device, and the like. Other categories may include audiences that may be considered technically averse, early adapters, i.e., boys and girls that may be aged from 10-19 that have an internet browser history may suggest interest in certain products, or late adapters, i.e., men and women over the age of 40 that have internet browser histories and/or purchase histories that may suggest interest in certain products. The first cache manager then stores the profiles into a first data store.

The first cache manager then selects a plurality of profile subsets from the profiles. The profile subsets of the profiles are comprised of certain data selections of the profiles that match selection criteria submitted by clients who register for receiving groomed data derived from the first data store by the first cache manager based on the subject selection criteria. Some of the data parameters in the profiles may not be in the data selections of the profile subsets. For example, a certain company may wish to advertise only to women, aged 30-35, with an occupation as an artist that has an annual salary of $40,000-$60,000 as this may be the audience that is most likely to gain interest in a targeted advertisement that is directed towards them. Another example may be a company that wants to exclude advertising to men over the age of 40 with salaries over $60,000 as they may be less likely to gain interest in an advertisement from a certain company. The companies establish the certain data parameters that they select to target audiences.

With the plurality of profile subsets selected, the first cache manager transmits the profile subsets to a second cache manager. The second cache manager stores the profile subsets in a second data store. The profile subsets stored in the second data store may be referred to as tier 3 data. In an embodiment, there may be one or more data stores that the first cache manager and the second cache manager may store the profiles and profile subsets to, respectively. The second cache manager is communicatively coupled with an ad gateway. The ad gateway requests for one or more of the profile subsets when it requested to select a targeted advertisement. The second cache manager transmits the profile subsets to the ad gateway where the ad gateway selects a targeted advertisement using the profile subsets. Because the tier 3 data is both transformed and selected to exclude undesired information (at least a specific profile subset may be considered to exclude undesired information, and it is the specific profile subset that would be searched by an application using tier 3 data), searches for specific information in the tier 3 data can be more efficient, supporting enhanced response times for applications using the tier 3 data, for example a targeted ad selection application executing on an ad gateway or on another server.

Turning now to FIG. 1, a communication system 100 is described. The system 100 comprises a data management platform server 102, a first cache manager 104, a second cache manager 106, an ad gateway 108, a plurality of workstations 110, a network data store 112, a profile data store 114, a profile subset data store 118, and a network 126. The profile data store 114 comprises a plurality of profiles 116, and the profile subset data store 118 comprises a first profile subset 120, a second profile subset 122, and an nth profile subset 124.

The first cache manager 104, the second cache manager 106, the ad gateway 108, the workstations 110 may be implemented as computer systems. In an embodiment, the data stores 112, 114, 118 may be implemented as computer systems or at least access to the data stores 112, 114, 118 may be mediated by a front end implemented as a computer system. Computer systems are described further hereinafter. The cache managers 104, 106 may be executed on different computers or on the same computer. The data stores 112, 114, 118 may be implemented on different computers. Alternatively, two or more of the data stores 112, 114, 118 may be implemented on the same computer. In an embodiment, one or more of the cache managers 104, 106 may execute on the same computer as one or more of the data stores 112, 114, 118.

The data management platform server 102 receives raw data from the network data store 112. The raw data is comprised of accumulated information about individuals that comprises one or more of gender, age, height, weight, hair color, occupation, salary, purchase history, internet browser history, or other data of individuals. The first cache manager 104 receives the raw data from the data management platform server 102. The first cache manager 104 transforms the raw data and indexes the data by the identities of the individuals into profiles 116 which the first cache manager 104 stores to the profile data store 114. The profiles 116 are further comprised of data parameters that may include information associated with the gender, age, height, weight, hair color, occupation, salary, purchase history, internet browser history, or other parameters of data of each of the individuals. In an embodiment, the profiles 116 may also comprise behavioral information about the individuals associated with the profiles 116. The behavioral information may comprise frequency of use of social media websites, frequency of visitation of sports websites, on-line purchase history, or other facets of behavior.

Some of the data parameters may be assigned decile values. For example, age of an individual may be assigned values in a decile system as: ages 0-9 may be assigned a value of 1, ages 10-19 may be assigned a value of 2, ages 20-29 may be assigned a value of 3, ages 30-39 may be assigned a value of 4, ages 40-49 may be assigned a value of 5, ages 50-59 may be assigned a value of 6, ages 60-69 may be assigned a value of 7, ages 70-79 may be assigned a value of 8, ages 80-89 may be assigned a value of 9, ages 90 and up may be assigned a value of 10. Some of the other data parameters of the profiles 116 may be assigned enumerated values like the given example. In an embodiment, the first cache manager 104 transforms some of the raw data into decile values, quartile values, quintile values, or other enumerated values. The first cache manager 104 then stores each of the profiles 116 into the profile data store 114.

The first cache manager 104 may also select data parameters and generate a plurality of profile subsets 120, 122, and 124 from the profiles 116. The profile subsets 120, 122, and 124 are comprised of certain data selections of the data parameters. These selections that make up these profile subsets 120, 122, and 124 may comprise certain data parameters from the profiles 116 that may be selected by clients that wish to select advertisements for a target audience. For example, a certain client may wish to advertise only to women, aged 30-35, with an occupation as an artist with an annual salary of $40,000-$60,000 as the client may feel that they are best suited to promoting their product(s) to this group of individuals. Clients may use the plurality of workstations 110 to communicate with the first cache manager 104 to select and generate the profile subsets 120, 122, and 124 of the profiles 116 that they want. When the first cache manager 104 receives the selection criterion, the first cache manager 104 generates the profile subsets 120, 122, and 124 and then sends the profile subsets 120, 122, and 124 to the second cache manager 106.

The first cache manager sends the profile subsets 120, 122, and 124 to the second cache manager 106 and the second cache manager 106 stores the profile subsets 120, 122, and 124 to the profile subset data store 118. The workstations 110 associated with the clients send requests for one or more of the profile subsets 120, 122, and 124 to the ad gateway 108 which sends requests for the profile subsets 120, 122, and 124 to the second cache manager 106 and receives the profile subsets 120, 122, and 124 from the second cache manager 106. The ad gateway 108 then selects targeted advertisements using the information about the select individuals in the profile subsets 120, 122, and 124. In an embodiment, the data management platform server 102, the first cache manager 104, the second cache manager 106, the ad gateway 108, the plurality of workstations 110, the network data store 112, the profile data store 114, and the profile subset data store 118 may be communicatively coupled with the network 126. The network 126 may be a private network, a public network, or combination thereof.

In an embodiment, some of the data parameters may have time to live values. The time to live values of some of the data parameters may expire at predetermined intervals of time. In an embodiment, the second cache manager 106 assigns the time to live values to the selected data parameters. When the time to live values of the selected data parameters expire, the second cache manager pushes a request for updated information to the first cache manager 104 which then receives the updated information from the data management platform server 102 via the network data store 112.

In an embodiment, there may be several mechanisms by which the profile 116 information is updated. First, on initialization of the profile subsets 120, 122, and 124, the profile 116 information is updated by the first cache manager 104 which receives updated profile 116 information from the data management platform server 102 via the network data store 112. Second, when the first cache manager 104 receives profile 116 information updates, the updated information is pushed to the second cache manager 106 which updates the profile subsets 120, 122, and 124. Third, the second cache manager 106 may update the profile 116 information in the profile subsets 120, 122, and 124 on its own as the second cache manager 106 may detect corruption of the profile 116 information in the profile subsets 120, 122, and 124 or that a time to live has expired in the profile subsets 120, 122, and 124. In an embodiment, a system administrator may be able to update or delete profile 116 information when time to live values expire or when profile 116 information is corrupted. In an embodiment, there may other mechanisms by which updated profile 116 information is pushed from the first cache manager 104 to the second cache manager 106.

In an embodiment, the data management platform server 102 receives raw data from the network data store 112. The data is comprised of accumulated information about individuals which includes gender, age, height, weight, hair color, occupation, salary, internet browser history, purchase history, or more information about an individual. In an embodiment, the data management platform server 102 receives the raw data from the network data store 112 at a predetermined periodic rate. In an embodiment, some of the information may not be available in the network data store 112. The data management platform server 102 transmits the raw data to the first cache manager 104.

The first cache manager 104 transforms the raw data into profiles 116 and indexes the data by the identities of the individuals of the profiles 116. In an embodiment, each of the profiles 116 is comprised of data parameters that comprise one or more of gender, age, height, weight, hair color, occupation, salary, purchase history, internet browser history, or other parameters of data. In an embodiment, the data may be transformed by an application that is coupled with the data management platform server 102. The first cache manager may 104 may also update, extend, or refresh existing profiles 116. The first cache manager 104 further transforms the data by placing some of the data in the profiles 116 into a decile system. For example, age of an individual may be ranked in the decile system as: ages 0-9 may be assigned a value of 1, ages 10-19 may be assigned a value of 2, ages 20-29 may be assigned a value of 3, ages 30-39 may be assigned a value of 4, ages 40-49 may be assigned a value of 5, ages 50-59 may be assigned a value of 6, ages 60-69 may be assigned a value of 7, ages 70-79 may be assigned a value of 8, ages 80-89 may be assigned a value of 9, ages 90 and up may be assigned a value of 10.

Another example of the first cache manager 104 placing the data of the profiles 116 into a decile system may include the first cache manager 104 organizing a salary of $0-$15,000 may be assigned a value of 1, a salary of $15,001-$30,000 may be assigned a value of 2, a salary of $30,001-$45,000 may be assigned a value of 3, a salary of $45,001-$60,00 may be assigned a value of 4, a salary of $60,001-$75 may be assigned a value of 5, a salary of $75,001-$90,000 may be assigned a value of 6, a salary of $90,001-$115,000 may be assigned a value of 7, a salary of $115,001-$130,000 may be assigned a value of 8, a salary of $130,001-$145,000 may be assigned a value of 9, and a salary of $145,001 and may be assigned a value of 10.

In an embodiment, some of the data parameters of the profiles 116 may be represented in the decile system, a centile system, a quartile system, a quintile system, or another system to rank the data. The data is placed in a decile system to make targeting data easier for clients associated with the plurality of workstations 110 that may wish to reach a target audience using targeted advertisements. An example of the first cache manager 104 ranking the data in the profiles 116 into a centile classification system may include organizing salary of the individuals, wherein salaries of $0-30,000 may be assigned values of 1-10, salaries of $30,001-$35,000 may be assigned values of 11-20, salaries $35,001-$40,000 may be assigned values of 21-30, salaries of $40,001-$45,000 may be assigned values of 31-40, salaries of $45,001-$50,000 may be assigned values of 41-50, salaries of $50,001-$55,000 may be assigned values of 51-60, salaries of $55,001-$60,000 may be assigned values of 61-70, salaries of $60,001-$65,000 may be assigned values of 71-80, salaries of $65,001-$70,000 may be assigned values of 81-90, and salaries of $70,001 and up may be assigned values of 91-100. The first cache manager 104 stores the profiles 116 to the profile data store 114. In an embodiment, the profiles 116 may be stored to the network data store 112, to a memory of the first cache manager 104, or another memory that is available to store the profiles 116.

In an embodiment, the raw data of the plurality of data parameters may be mapped to a single category that could serve as an example of a profile subset. For example, men and women, aged 20-50, with occupations as computer programmers, engineers, or other occupations where it is useful to be technologically proficient may be categorized as 'Tech Savvy.' Another example may be boys and girls, ages 10-19, with internet browser histories that show interest in technology products may be categorized as 'early adapters.' Another example may be a category entitled 'sports' that comprises men age 20-55, with internet browser and purchase histories that suggests an interest in sports. In an embodiment, clients such as America Online (AOL) and Yahoo may receive profile subsets that comprise profiles of only their customers.

The first cache manager 104 then receives a request for profile subsets of the profiles 116 from the second cache manager 106. In an embodiment, the profile subsets are represented by subset$_1$ 120, subset$_2$ 122, and subset$_n$ 124. In an embodiment, while three profile subsets 120, 122, and 124 are illustrated in FIG. 1, it is understood that there may be more profile subsets. In an embodiment, the profile subsets 120, 122, and 124 may comprise less than the data parameters that are established in the profiles 116. In an embodiment, the profile subsets 120, 122, and 124 are determined by a plurality of clients that are communicatively coupled with the plurality of workstations 110 that are in communication with the ad gateway 108 that want particular information about individuals placed in the decile system. In an embodiment, the clients that are associated with the workstations 110 may use the profile subsets 120, 122, and 124 to target an audience that matches their advertisements. They may select the profile subsets 120, 122, and 124 using selected data parameters from the profiles 116 or select profiles from the profiles 116.

In an embodiment, the companies that are communicatively coupled to the plurality of workstations 110 and the ad gateway 108 use the profile subsets 120, 122, and 124 to send targeted advertisements that match pre-defined data parameters that they wish to use to select targeted advertisements. In an embodiment, the companies that are communicatively coupled to the plurality of workstations 110 and the ad gateway 108 may select 3 of the data parameters that they wish to target such as age, salary, and purchase history to select for the profile subsets 120, 122, and 124 for targeted advertisements that the ad gateway 108 selects and sends. For example, a certain company may wish to advertise only to women, aged 30-35, with an occupation as an artist that has an annual salary of $40,000-$60,000.

The first cache manager 104 transmits the profile subsets 120, 122, and 124 to the second cache manager 106. The second cache manager 106 stores the profile subsets 120, 122, and 124 to the profile subset data store 118. In an embodiment, the profile subsets 120, 122, and 124 may be stored to the profile subset data store 118, but also may be stored to the network data store 112, the profile data store 114, or another memory that is available for storing the profile subsets 120, 122, and 124. The second cache manager 106 then receives a request for one or more of the profile subsets 120, 122, and 124 from the ad gateway 108 when the ad gateway receives requests from the plurality of workstations 110 to select targeted advertisements. The second cache manager 106 transmits the requested profile subsets 120, 122, and 124 to the ad gateway 108 which then selects and sends targeted advertisements using the profile subsets 120, 122, and 124. The profile subsets 120, 122, and 124 may be used by clients associated with the workstations 110 as target audiences to send targeted advertisements to. The profile subsets 120, 122, and 124 may comprise target individuals that the clients associated with the workstations 110 believe to be the best audience to promote their product(s)/service(s) to.

Figure 2:
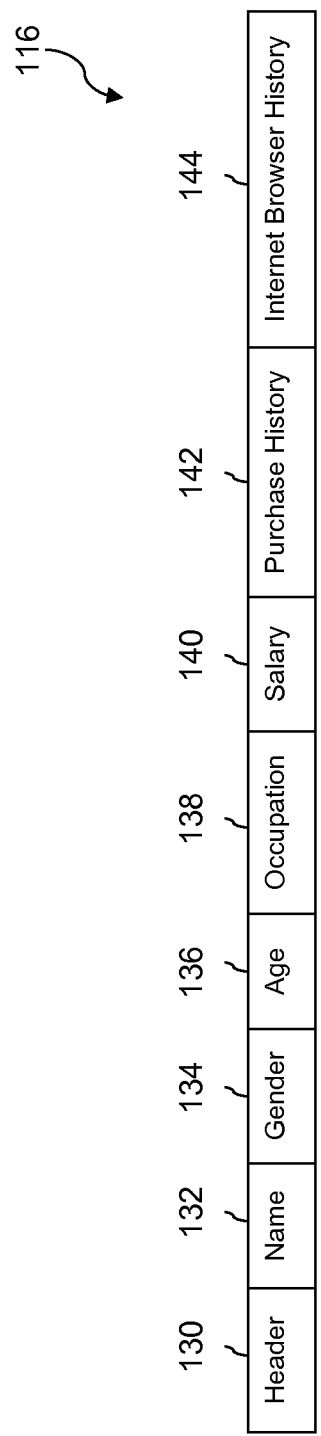
FIG. 2 is a block diagram of a profile according to an embodiment of the disclosure.

FIG. 2 depicts a block diagram of the profile 116. The profile 116 comprises a plurality of data parameters associated with a single individual, for example a user of a mobile communication device. These data parameters may comprise a header 130, a name 132, a gender 134, an age 136, an occupation 138, a salary 140, a purchase history 142, and an internet browser history 144 of an individual. In an embodiment, the header 130 may be comprised of information from the profile 116 such as the name 132, the gender 134, or other parameters of data. In an embodiment, names of the individuals are used as headers or identifiers for the profile 116. A key that comprises information from the profile 116 and the name may also be used as an identifier for the second cache manager 106 to select a correct profile subset when requested to propagate information regarding an individual. In addition to some of the data parameters, the key may comprise information such as an individual's internet protocol address, their phone number, their email address, and other information. In an embodiment, subsets are created when clients select certain data parameters that match target audience to send targeted advertisements. In an embodiment, the profile 116 may comprise more data parameters. The profile 116 may also comprise less data parameters as some of the data for the data parameters may not be available to generate the complete profile 116 as illustrated in FIG. 2.

Figure 3A:
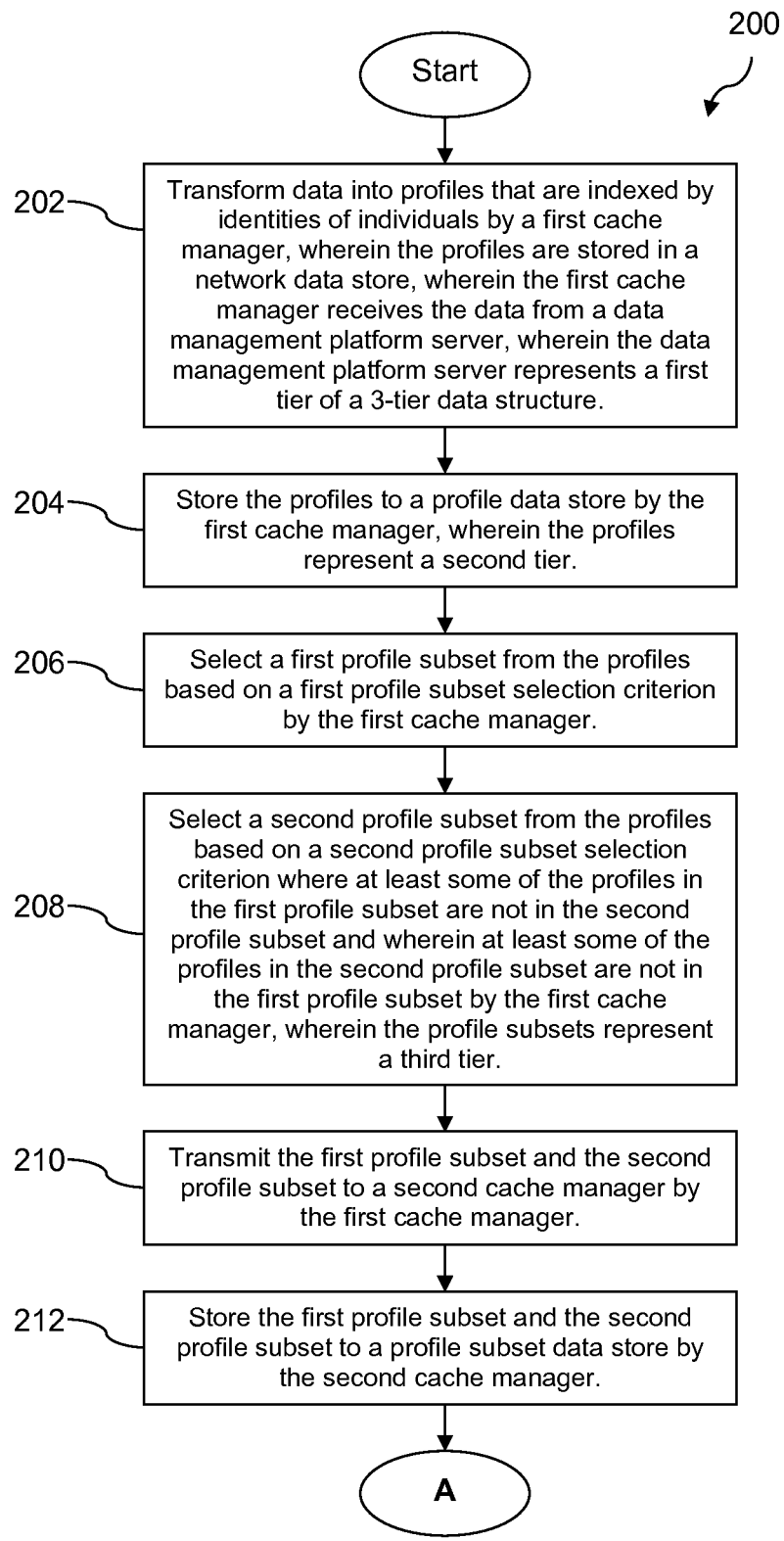
FIGS. 3A and 3B are a flow chart of a method according to an embodiment of the disclosure.
Figure 3B:
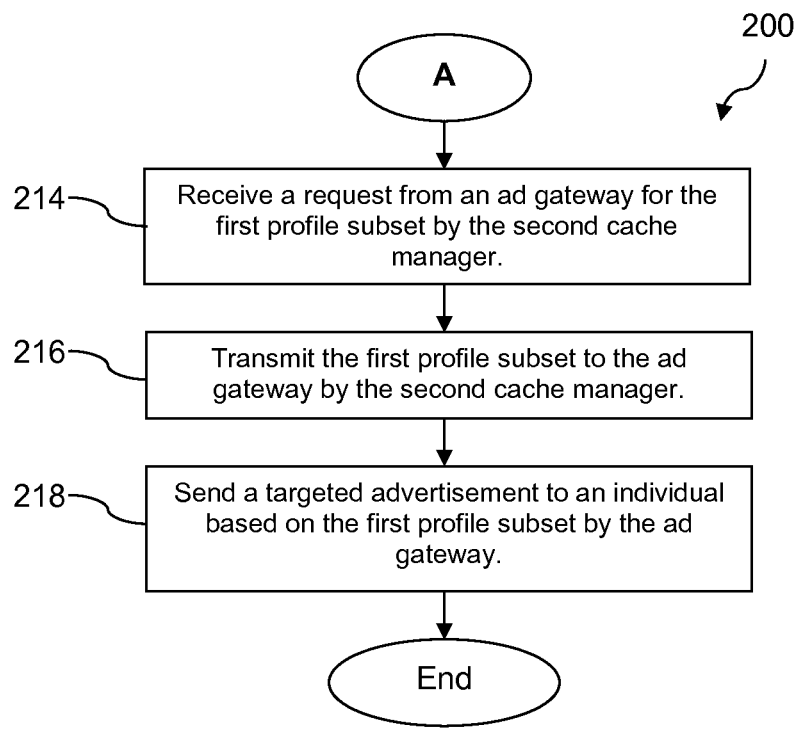

In FIG. 3, a method 200 is described. At block 202, a first cache manager transforms data into profiles that are indexed by identities of individuals, wherein the profiles are stored in a network data store, wherein the first cache manager receives the data from a data management platform server, wherein the data management platform server represents a first tier of a 3-tier data structure. At block 204, the first cache manager stores the profiles to a profile data store, wherein the profiles represent a second tier. At block 206, the first cache manager selects a first profile subset from the profiles based on a first profile subset selection criterion. At block 208, the first cache manager selects a second profile subset from the profiles based on a second profile subset selection criterion where at least some of the profiles in the first profile subset are not in the second profile subset and wherein at least some of the profiles in the second profile subset are not in the first profile subset, wherein the profile subsets represent a third tier. In an embodiment, the separate profile subsets may be comprised of the same profiles, but the profile subsets may be comprised of different parameters of data from the profiles, wherein the first profile subset may comprise an age, a gender, an occupation, and a salary of an individual, but the other profile subset may only comprise an age and a gender. At block 210, the first cache manager transmits the first profile subset and the second profile subset to a second cache manager. At block 212, the second cache manager stores the first profile subset and the second profile subset to a profile subset data store. At block 214, the second cache manager receives a request from an ad gateway for the first profile subset. At block 216, the second cache manager transmits the first profile subset to the ad gateway. At block 218, the ad gateway sends a targeted advertisement to an individual based on the first profile subset.

Figure 4:
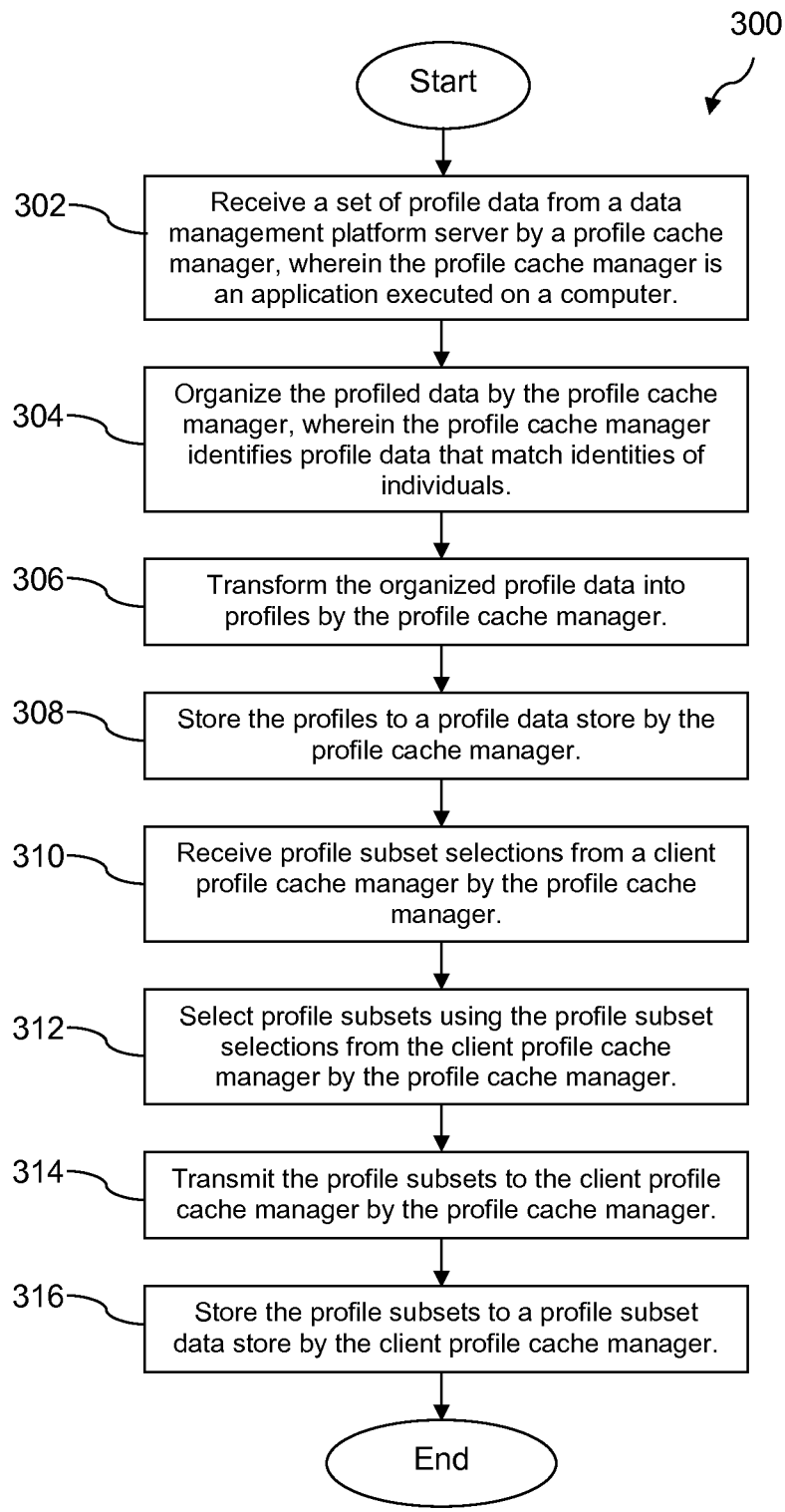
FIG. 4 is a flow chart of a method according to an embodiment of the disclosure.

In FIG. 4, a method 300 is described. At block 302, a profile cache manager receives a set of profile data from a data management platform server. At block 304, the profile cache manager organizes the profile data, wherein the profile cache manager identifies profile data that matches identities of individuals. At block 306, the profile cache manager transforms the organized profile data into profiles. At block 308, the profile cache manager stores the profiles to a profile data store. At block 310, the profile cache manager receives profile subset selections from a client profile cache manager. At block 312, profile cache manager selects profile subsets using the profile subset selections from the client profile cache manager. At block 314, the profile cache manager transmits the profile subsets to the client profile cache manager. At block 316, the client profile cache manager stores the profile subsets to a profile subset data store.

Figure 5:
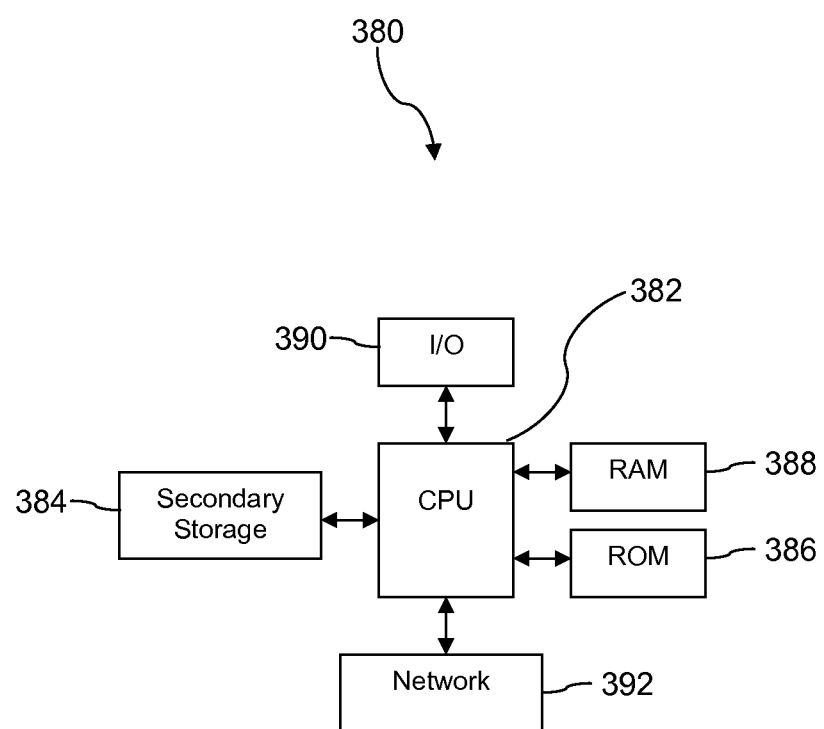
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A data management platform server that organizes and transforms data in a 3-tier data structure, comprising:
a processor of the server;
a non-transitory memory of the server; and
an application stored in the non-transitory memory, that when executed by the processor,
transforms raw data into discrete values and stores the discrete values in a plurality of profiles that are indexed by identities of individuals, wherein the raw data is stored in a network data store, and wherein the network data store is implemented on a first computer and represents a first tier of data,
stores the plurality of profiles to a profile data store, wherein the profile data store is implemented on a second computer that is separate from the first computer, and wherein the profile data store represents a second tier of data,
generates a first profile subset from the plurality of profiles stored in the profiles data store based on a first profile subset selection criterion received by a first client, wherein the first profile subset comprises derived profiles that comprise fewer data parameters than the plurality of profiles stored in the profile data store comprise,
generates a second profile subset from the plurality of profiles stored in the profile data store based on a second profile subset selection criterion received by a second client, wherein the first profile subset selection criterion and the second profile subset selection criterion comprise two or more of age, gender, occupation, salary, or purchase history, and wherein at least some profiles in the first profile subset are not in the second profile subset and at least some profiles in the second profile subset are not in the first profile subset,
stores the first profile subset and the second profile subset in a profile subset data store, wherein the profile subset data store is implemented on a third computer that is separate from the first computer and the second computer, and wherein the profile subset data store represents a third tier of data,
subsequently receives a request from an ad gateway for the first profile subset based on an ad request, and
in response to the request, searches the third tier of data in the profile subset data store implemented on the third computer;
in response to searching the third tier of data in the profile subset data store, obtains data corresponding to the first profile subset more rapidly than the data corresponding to the first profile subset would be obtained by searching the first tier of data or the second tier of data for the data corresponding to the first profile subset; and
transmits the first profile subset from the profile subset data store to the ad gateway.

2. The server of claim 1, wherein the raw data comprises accumulated information about individuals that comprises at least two of gender, age, occupation, salary, internet history, and purchase history of the individuals.

3. The server of claim 2, wherein the application transforms the raw data by taking the ages of the individuals and organizing them into a decile classification system.

4. The server of claim 3, wherein ages 0-9 are assigned a value of 1, ages 10-19 are assigned a value of 2, ages 20-29 are assigned a value of 3, ages 30-39 are assigned a value of 4, ages 40-49 are assigned a value of 5, ages 50-59 are assigned a value of 6, ages 60-69 are assigned a value of 7, ages 70-79 are assigned a value of 8, ages 80-89 are assigned a value of 9, and ages 90 and up are assigned a value of 10.

5. The server of claim 2, wherein the application transforms the raw data about salaries of the individuals into a decile classification system.

6. The server of claim 5, wherein a salary of $0-$15,000 is assigned a value of 1, a salary of $15,000-$30,000 is assigned a value of 2, a salary of $30,000-$45,000 is assigned a value of 3, a salary of $45,000-$60,00 is assigned a value of 4, a salary of $60,000-$75,000 is assigned a value of 5, a salary of $75,000-$90,000 is assigned a value of 6, a salary of $90,000-$115,000 is assigned a value of 7, a salary of $115,000-$130,000 is assigned a value of 8, a salary of $130,000-$145,000 is assigned a value of 9, and a salary of $145,000 and up is assigned a value of 10.

7. The server of claim 1, wherein the application selects 3 categories that comprise age, salary, and purchase history to generate the second profile subset for targeted advertisements that the ad gateway sends.

8. The server of claim 1, wherein an elapsed time from receiving the request from the ad gateway for the first profile subset based on the ad request to transmitting the first profile subset from the profile subset data store to the ad gateway is no more than 2 seconds.

9. A method of transforming and organizing profile data using a data management platform server and a plurality of cache managers in a 3-tier data structure, comprising:
　transforming, by a first cache manager stored in a non-transitory memory and executable by a processor, raw data into discrete values and storing, by the first cache manager, the discrete values in a plurality of profiles that are indexed by identities of individuals, wherein the raw data is stored in a network data store, and wherein the network data store is implemented on a first computer and represents a first tier of data;
　storing, by the first cache manager, the plurality of profiles to a profile data store, wherein the profile data store is implemented on a second computer that is separate from the first computer, and wherein the profile data store represents a second tier of data;
　generating, by the first cache manager, a first profile subset from the plurality of profiles stored in the profiles data store based on a first profile subset selection criterion received by a first client, wherein the first profile subset comprises derived profiles that comprise fewer data parameters than the plurality of profiles stored in the profile data store comprise;
　generating, by the first cache manager, a second profile subset from the plurality of profiles stored in the profiles data store based on a second profile subset selection criterion received by a second client, wherein the first profile subset selection criterion and the second profile subset selection criterion comprises two or more of age, gender, occupation, salary, or purchase history, and wherein at least some profiles in the first profile subset are not in the second profile subset and at least some profiles in the second profile subset are not in the first profile subset;
　transmitting, by the first cache manager, the first profile subset and the second profile subset to a second cache manager stored in a non-transitory memory and executable by a processor;
　storing, by the second cache manager, the first profile subset and the second profile subset to a profile subset data store, wherein the profile subset data store is implemented on a third computer that is separate from the first computer and the second computer, and wherein the profile subset data store represents a third tier of data;
　subsequently receiving, by the second cache manager, a request from an ad gateway for the first profile subset based on an ad request;
　in response to the request, searching, by the second cache manager, the third tier of data in the profile subset data store implemented on the third computer;
　in response to searching the third tier of data in the profile subset data store, obtaining data corresponding to the first profile subset more rapidly than the data corresponding to the first profile subset would be obtained by searching the first tier of data or the second tier of data for the data corresponding to the first profile subset; and
　transmitting, by the second cache manager, the first profile subset to the ad gateway.

10. The method of claim 9, wherein the first cache manager transforms an age of the individual in to a centile value.

11. The method of claim 9, wherein the first cache manager transforms the raw data by taking the salary data of the individuals into a centile value.

12. The method of claim 11, wherein the centile values are assigned to the salary of an individual, wherein salaries of $0-30,000 are assigned values 1-10, salaries of $30,001-$35,000 are assigned values 11-20, salaries $35,001-$40,000 are assigned values 21-30, salaries of $40,001-$45,000 are assigned values 31-40, salaries of $45,001-$50,000 are assigned values 41-50, salaries of $50,001-$55,000 are assigned values 51-60, salaries of $55,001-$60,000 are assigned values 61-70, salaries of $60,001-$65,000 are assigned values 71-80, salaries of $65,001-$70,000 are assigned values 81-90, and salaries of $70,001 and up are assigned values 91-100.

13. The method of claim 9, wherein the second profile subset is determined by a plurality of clients in communication with the ad gateway that desire particular information about individuals.

14. The method of claim 13, wherein the second client uses the second profile subset to send targeted advertisements to mobile communication devices of individuals associated with the second profile subset.

15. A method of transforming profile data into client profiles in a three tier data system using cache managers, comprising:
　receiving, by a profile cache manager stored in a non-transitory memory of a first computer and executable by a processor of the first computer, a set of raw profile data from a data management platform server, wherein the raw profile data is stored in a network data store that represents a first tier of data;
　organizing, by the profile cache manager, the raw profile data by identifying raw profile data that matches identities of individuals;
　transforming, by the profile cache manager, the organized raw profile data into discrete values and storing the discrete values in a plurality of profiles;
　storing, by the profile cache manager, the plurality of profiles to a profile data store, wherein the profile data store is implemented on a second computer that is separate from the first computer, and wherein the profile data store represents a second tier of data;
　receiving, by the profile cache manager, profile subset selections criteria from a plurality of clients via a client profile cache manager stored in a non-transitory memory of a computer and executable by the computer;
　generating, by the profile cache manager, profile subsets from the plurality of profiles stored in the profile data store using the profile subset selections criteria from the client profile cache manager, wherein the profile subset selections criteria comprises two or more of age, gender, occupation, salary, or purchase history, and wherein the profile subsets comprises derived profiles that comprise fewer data parameters than the plurality of profiles stored in the profile data store comprise;

transmitting, by the profile cache manager, the profile subsets to the client profile cache manager;

storing, by the client profile cache manager, the profile subsets to a profile subset data store, wherein the profile subset data store is implemented on a third computer that is separate from the first computer and the second computer, and wherein the profile subset data store represents a third tier of data;

subsequently receiving, by the client profile cache manager, a request from an ad gateway for one of the profile subsets based on an ad request; and in response to the request, searching, by the client profile cache manager, the third tier of data in the profile subset data store implemented on the third computer;

in response to searching the third tier of data in the profile subset data store, obtaining data corresponding to the first profile subset more rapidly than the data corresponding to the first profile subset would be obtained by searching the first tier of data or the second tier of data for the data corresponding to the first profile subset; and transmitting, by the client profile cache manager, the one of the profile subsets to the ad gateway.

16. The method of claim 15, wherein the plurality of profiles have data parameters that comprise gender, age, occupation, salary, purchase history, or internet browser history.

17. The method of claim 15, wherein the ad gateway sends a request to the client profile cache manager for at least two of the profile subsets to generate targeted advertisements.

18. The method of claim 17, wherein the client profile cache manager sends a first profile subset to the ad gateway when the ad gateway requests for the first profile subset to generate targeted advertisements for the first profile subset.

19. The method of claim 17, wherein the client profile cache manager sends a second profile subset to the ad gateway when the ad gateway requests for the second profile subset to generate targeted advertisements for the second profile subset.

* * * * *